Aug. 16, 1966     H. J. OYLER     3,266,409
BARBECUING OVEN
Filed April 24, 1964
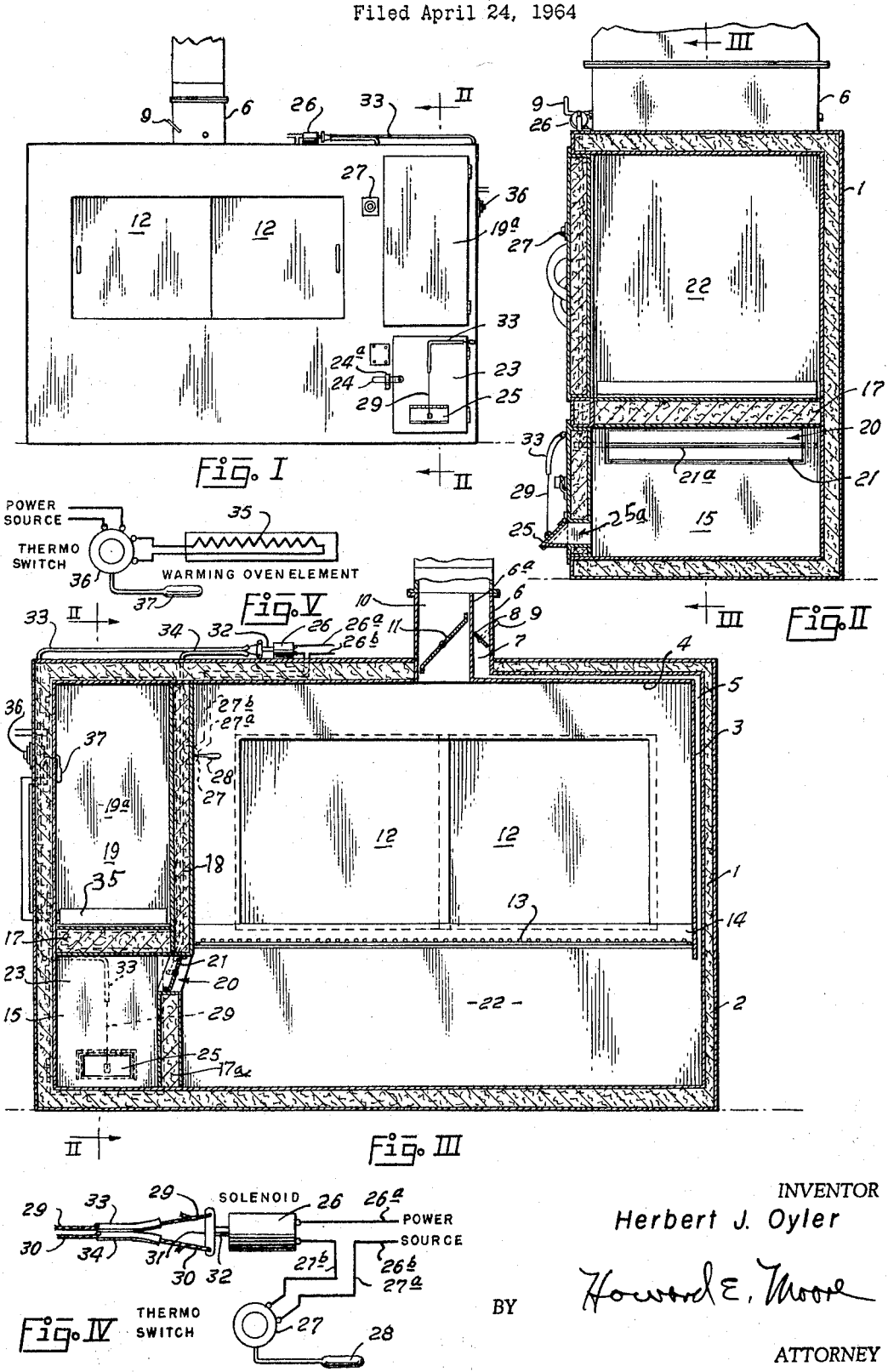
INVENTOR
Herbert J. Oyler
BY Howard E. Moore
ATTORNEY

United States Patent Office 3,266,409
Patented August 16, 1966

3,266,409
BARBECUING OVEN
Herbert J. Oyler, 202 S. Montreal St., Dallas, Tex.
Filed Apr. 24, 1964, Ser. No. 362,240
4 Claims. (Cl. 99—259)

This invention is concerned with improvements in a barbecue cooking oven, and is particularly concerned with means for uniformly distributing heat and smoke about the meat being cooked, and means for automatically controlling the degree of heat applied to the meat, and consequently the rate of cooking same.

In barbecuing meat it is desirable in order to maintain the moisture content and bulk thereof, to cause flavor to uniformly penetrate same, and prevent the undue searing of the outer surface thereof to uniformly expose the meat to heat and smoke and to cook the meat at a uniform temperature over an extended period of time.

The present invention is an improvement over my previous invention disclosed and claimed in U.S. Patent No. 3,041,959 issued July 3, 1962, entitled, "Means for Barbecuing Meat," in which hot gases and smoke from burning charcoal or wood was caused to pass horizontally along the barbecue rack to uniformly cook the meat thereon by forcing same to pass through a passage located at the remote end of the meat rack from the firebox in order to reach the exhaust flue. Switch means was provided which was actuated by opening the doors to the oven to open a damper in the upper portion of the oven in order to allow smoke and heat from combustion to pass upwardly to the exhaust flue in order to prevent such smoke and heat from entering the room wherein the barbecue oven was situated.

The barbecue oven disclosed herein includes the features of said Patent No. 3,041,959, and in addition incorporates improved heat and smoke discharge passages and the novel automatic heat responsive control for regulating the temperature and smoke content in the cooking compartment of the oven.

It is, therefore, a primary object of the invention to provided in a barbecue oven means for automatically controlling the temperature in the cooking oven and therefore the amount of heat applied to the meat disposed therein and the period of time within which the meat is cooked.

Still another object of the invention is to provide a heat responsive control for maintaining the desired level of temperature in a barbecue oven by opening or closing the damper to the firebox simultaneously with the opening or closing of the damper in a passage between the firebox and the cooking compartment, which controls not only the amount of heat and smoke entering the cooking compartment from the firebox, but prolongs the burning of the fuel in the firebox, resulting not only in more uniformly cooked meat, but conserving fuel.

Still another object of the invention is to provide in a barbecuing oven a firebox and a cooking compartment, with a damper controlled passage between the firebox and the cooking compartment, and a damper for controlling entrance of air to the firebox, with thermo-actuated means connected between the damper in the passage from the firebox to the cooking compartment and thermo-actuated means connected to the damper in the firebox, which are simultaneously actuated to open or close the separate dampers simultaneously, to suppress ignition in the firebox simultaneously with discontinuance of supply of heat and smoke to the cooking compartment.

A still further object of the invention is to provide in a cooking oven of the type indicated above a warming oven compartment, with thermo-actuated switch means to control the temperature in said warming oven.

Other and further objects of the invention will become apparent upon reading the detailed specification hereinafter following, and by referring to the drawing annexed hereto.

A suitable form of the invention is shown in the attached drawing, wherein:

FIGURE I is a front elevational view of the barbecue cooking oven incorporating the improvements comprehended by this invention;

FIGURE II is a cross-sectional, elevational view taken on the line II—II of FIGURE I;

FIGURE III is a cross-sectional, elevational view taken on the line III—III of FIGURE II;

FIGURE IV is a schematic drawing of the electrical circuit for automatically controlling temperature in the cooking compartment, and the rate of combustion in the firebox; and FIGURE V is a schematic drawing of the warming oven heating element with the automatic thermo-responsive circuit for controlling the heat in the warming oven.

Numeral references are employed to designate the various parts shown in the drawing, and like numerals indicate the like parts throughout the various figures of the drawing.

The numeral 1 indicates the general housing for the barbecue cooking oven which includes insulated walls 2 on all sides.

A spaced inner wall 3 is provided at one end of the housing which is continuous with the spaced upper wall portion 4. The spaced walls 3 and 4 provides a passage 5 which terminates at its lower end at a point spaced from the bottom of the housing.

The exhaust outlet 6 is divided into two vertical exhaust passages 7 and 10 by a vertical wall 6a.

A manually operated damper 8 is pivotally attached in the passage 9, and is arranged to control the flow of smoke and gases from the cooking chamber 22 through the flue. The damper 8 may be operated by a handle 9, from exteriorly of the exhaust flue 6.

The amount of heat and smoke confined within the cooking chamber 22 may be controlled by manipulation of the damper 8.

The flow of smoke and gases of combustion and cooking through the exhaust flue passage 10 is controlled by the pivoted damper 11 extending thereacross.

The damper 11 is normally closed during the cooking period except when one of the doors 12 is opened in order to turn the meat cooking in the cooking chamber 22, or to place meat therein or remove same therefrom. The damper 11 could be manually operated, but preferably it is automatically operated in the manner shown in my Patent No. 3,041,959, wherein a switch is engaged and closed upon opening one of the doors 12 to close an electric circuit connected in series with a solenoid to energize the solenoid and thereby actuate a lever to rotate and open the damper 11. Thus when one of the doors 12 is slid open, the damper 11 is automatically opened, to allow smoke and gases within the cooking chamber 22 to quickly exhaust upwardly through the exhaust vent 6, and thereby prevent the smoke and gases from coming out through the access opening exposed by the opening of the door 12 into the room wherein the barbecue oven is situated, and in the face of the operator. The doors 12 are separately slidable laterally to allow access to the meat rack 13, whereon the meat or other food being cooked is disposed.

The meat rack 13 is constructed of foraminous material, such as expanded metal, or spaced rods welded to a frame. As shown it is constructed of spaced rod material. The meat rack 13 is preferably removably positioned on angle members 14 secured to the inner side of the housing and having outwardly extending flanges thereon on which the meat rack may rest.

It will be noted that the meat rack 13 extends between the lower ends of the inner wall 3 and the insulated part-wall 18. The lower end of war 18 terminates substantially in alignment with the lower en dof the wall 3 and provides one end of the cooking compartment 22.

The firebox 15 is formed by the outer walls of the housing, the transverse insulated partition 17, and an insulated part-wall 17a, which has its upper end spaced from the lower end of the wall 18 and partition 17, to provide a passage 20 between the firebox 15 and the cooking chamber 22.

A pivoted damper 21 is mounted on a rod 21a rotatably attached at each end to opposite walls of the housing, and controls the flow of smoke and hot gases from combustion created in the firebox 15 through the passage 20 into the cooking chamber 22.

The firebox 15 may be closed by a hinged door 23 and may be latched in closed position by means of a pivoted latch 24 engageable with a retainer 24a secured to the outer side of the housing. A pivoted damper door 25 is hingedly attached at its upper edge to the door 23 so that it is openable upwardly and controls the flow of air through the passage 25 into the firebox 15.

A solenoid 26, having a movable core arm 32 therein, is mounted on top of the housing 1.

A thermo-switch 27 is mounted on the inner side of the wall 18 within the cooking oven 22. The thermo-switch 27 is controlled by a thermo-couple prod 28 extending into the cooking chamber 22. The switch 27 is normally closed and is connected in series with one of the power supply lines 26a and 26b by the leads 27a and 27b. The solenoid 26 is thus energized and the core arm 32 is drawn inwardly. Upon the temperature within the cooking chamber 22 rising to a predetermined value, the thermo-couple 28 causes the thermo-switch 27 to open, thereby breaking the electric circuit to the solenoid 26, de-energizing same, and causing the arm 32 attached to the movable core within the solenoid, to move outwardly or to the left, as viewed in FIGURE IV.

The cables 29 and 30 are attached to opposite ends of the crossarm 31, which is secured to the outer end of the movable solenoid arm 32.

The cables 29 and 30 loosely pass through the sheaths 33 and 34, respectively, which are preferably formed of metal tubular members, and are secured to the housing.

The other end of the cable 29 extends downwardly through sheath 33 and is attached to the outer side of the firebox damper door 25. The outer end of the cable 30 extends through the sheath 34 downwardly along the inner wall of the housing, and is wound about the end of the rotatable shaft 21a on which the damper 21 is mounted.

When the solenoid 26 is energized and solenoid arm 32 moves inwardly, or to the right, as viewed in FIGURES III and IV, the cables 29 and 30 are moved in the same direction, causing the cable 29 to pull the damper door 25 on the firebox 15 upwardly and open same. Simultaneously the cable 30 rotates the damper shaft 21a, to open the damper 21. This allows air to be fed to the burning fuel within the box 15 through opening 25a, and at the same time allows smoke and gases from combustion therefrom to pass through the passage 20 into the cooking chamber 22. When the temperature within the cooking chamber 22 rises to a predetermined value, the thermo-couple 28 will cause the thermo-switch 27 to open, thereby breaking the electric circuit to the solenoid 26, allowing the arm 32 to move outwardly to the left, permitting the dampers 25 and 21 to simultaneously close the passage 25a into the firebox and the passage 20 from the firebox to the cooking oven. This cuts off the supply of gases of combustion and smoke to the cooking chamber, and at the same time cuts off the supply of air to the burning fuel in the firebox, reducing the combustion rate of the fuel and conserving same. When the temperature is again lowered in the cooking chamber 22 to sufficient extent to close the thermo-switch 27 by the action of thermo-couple 28, the solenoid 26 will again be energized and the dampers 25 and 21 will again be opened in the manner hereinbefore described. Thus the temperature in the cooking chamber 22 is maintained within predetermined ranges depending upon the setting of the thermo-switch 27.

It will be noted that the flue damper 11 is normally closed, except when one of the doors 12 is opened, as hereinbefore described. Therefore, all smoke and combustion gases must normally escape from the cooking chamber 22 through the passages 5 and 7. Thus normally smoke and heated gases will have a tendency to fill the combustion chamber 22 above the meat rack 13 and in order to escape from the combustion chamber 22 such smoke and combustion gases must move upwardly through the meat rack 13 and then as they slightly cool would have a tendency to move downwardly therethrough in order to reach the escape passage 5. The result is that heat and gases are evenly distributed throughout the cooking chamber 22, and circulate both upwardly and downwardly over the meat disposed on the meat rack 13. Thus the meat is evenly cooked from all sides and does not have a tendency to sear on one side. Moreover, the meat does not normally have to be turned while it is cooking, and by reason of maintaining a predetermined temperature in the cooking oven 22, the meat is uniformly cooked over a long period of time at a moderate heat. Thus the meat does not lose an excessive amount of its natural juices, and the smoke uniformly and thoroughly penetrates same, imparting thereto a superior flavor and consistency.

A separate warming compartment 19 is provided in the housing 1 where cooked meat, and other foods, may be placed and maintained in a warm condition after it is cooked. The warming compartment 19 has an access door 19a therefor.

The temperature in the warming compartment 19 is automatically controlled and maintained at a predetermined value by an electric heating element 35 which is supplied with current through a thermo-switch 36. The thermo-switch 36 is opened when the temperature within the warming oven 19 reaches a predetermined value by a thermo-couple prod 37 exposed within the warming compartment 19. The opening of the thermo-switch 36 discontinues the supply of current to the heating element 35 and cuts it off.

When the temperature in the warming oven 19 drops to a predetermined value, the thermo-switch 36 will again close connecting the supply of electric current to the heating element 35.

The operation and function of the device hereinbefore described is as follows:

The door 23 is opened and fuel for barbecuing, such as charcoal or wood, is placed in the cooking compartment 15 and ignited. The door is closed. At such time the dampers 25 and 21 are held open by the energized solenoid 26, and damper 8 is adjusted so that it is open or partially open. This provides a draft through opening 25a, opening 20, passage 5 and exhaust flue passage 7, maintaining combustion of the fuel in the firebox 15 and causing heat and smoke of combustion from the burning fuel to pass upwardly and then downwardly through the meat rack 13, as above explained.

When one of the sliding doors 12 is opened, same automatically opens the damper 11, allowing smoke and gases from combustion to directly exit through the flue passage 10, preventing same from boiling out into the room and into the face of the operator.

The meat to be cooked is placed on the rack 13 and the door 12 is closed. This allows the damper 11 to close and smoke and heat from the firebox passes upwardly and downwardly through the rack 13 about the meat disposed thereon and exits through the passages 5 and 7.

Upon the temperature within the cooking chamber 22 reaching a predetermined value, the thermo-couple 28 will open the thermo-switch 27 and de-energize the solenoid 26, allowing the solenoid arm 32 to move outwardly slacking off on the cables 29 and 30, and allowing the dampers 25 and 21 to close by gravity. This discontinues the supply of smoke and heat through the passage 20 to the cooking compartment 22, and conserves the fuel in the firebox 15 by cutting off the majority of the air for combustion therefrom. When the temperature within the cooking oven 22 is lowered to a predetermined value, the thermo-couple 28 will again close the thermo-switch 27 and energize the solenoid 26, pulling on the cables 29 and 30, opening the dampers 25 and 21, thus allowing the fuel in the firebox 15 to burn more freely and the heat and smoke therefrom will pass through the passage 20 into the cooking chamber 22 and exit through the passage 5 and flue passage 7.

It will thus be seen that I have provided an improvement in a barbecue cooking oven wherein the temperature in the cooking compartment is regulated and maintained at predetermined maximum and minimum value, which conserves fuel, provides for even distribution of heat and smoke about the meat while it is cooking, provides for the uniform cooking of the meat, without burning or unduly reducing the natural juice content thereof, which causes the uniform penetration of smoked flavor therein, and other advantages hereinbefore described.

It will be understood that other and further embodiments of my invention may be devised without departing from the spirit and scope of the appended claims.

Having described my invention, I claim:

1. In a device of the class described, a housing having, end, side, bottom and top walls; a fire compartment at one end of the housing; a cooking compartment in the housing; a passage from the fire compartment to the cooking compartment; an exhaust flue in the upper side of the housing having a first vertical passage and a second vertical passage therein both said first and second vertical passages being in communication with said cooking compartment; an inner wall in the housing spaced from the end wall and upper walls of the housing remote from the firebox providing a vent passage communicating between the first passage in the flue and the cooking compartment; a horizontal meat rack suspended to the housing within the cooking compartment and positioned intermediate the top and bottom walls of the housing above the upper side of the passage between the firebox and the cooking compartment and lower end of the vent passage; and damper means normally closing the second flue passage.

2. The combination called for in claim 1 with the addition of a pivoted adjustable damper in the first flue passage.

3. The combination called for in claim 1 with the addition of a pivoted damper controlling flow of air into the fire compartment; a pivoted damper in the passage between the fire compartment and the cooking compartment; a solenoid operatively connected to both of said dampers so as to open and close same in unison; a thermo-switch in the cooking compartment, and being electrically connected to the solenoid arranged to energize the solenoid at a predetermined minimum temperature in the cooking compartment to thereby open the said dampers.

4. In a barbecue cooking oven, a housing; a fire compartment in said housing; a cooking compartment in the housing; a passage from the fire compartment to the cooking compartment; a damper in said passage; a damper controlling admission of air to the fire compartment; a solenoid having a movable core arm; a thermo-switch in the cooking compartment electrically connected to the solenoid arranged to energize same at a predetermined minimum temperature in the cooking compartment; a line connecting the movable core arm and the first named damper; and a line connecting the movable core arm and the second named damper whereby the dampers may be opened in unison.

References Cited by the Examiner

UNITED STATES PATENTS

| | | | |
|---|---|---|---|
| 675,105 | 5/1901 | Oberle | 99—259 |
| 1,271,300 | 7/1918 | Flanagan | 99—259 |
| 2,143,999 | 1/1939 | Rosson | 126—25 |
| 2,558,569 | 6/1951 | Koch | 99—260 X |
| 2,851,941 | 9/1958 | Cogar | 99—259 |
| 3,041,959 | 7/1962 | Oyler | 99—260 |

FOREIGN PATENTS

| | | |
|---|---|---|
| 240,783 | 5/1946 | Switzerland. |
| 258,004 | 4/1949 | Switzerland. |

WALTER A. SCHEEL, *Primary Examiner.*

CLYDE I. COUGHENOUR, *Assistant Examiner.*